(12) United States Patent
Ogino

(10) Patent No.: US 9,277,115 B2
(45) Date of Patent: Mar. 1, 2016

(54) FOCUS ADJUSTMENT APPARATUS, FOCUS ADJUSTMENT METHOD AND PROGRAM, AND IMAGE PICKUP APPARATUS

(71) Applicant: CANON KABUSHIKI KAISHA, Tokyo (JP)

(72) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/518,543

(22) Filed: Oct. 20, 2014

(65) Prior Publication Data

US 2015/0109516 A1   Apr. 23, 2015

(30) Foreign Application Priority Data

Oct. 21, 2013   (JP) ................................ 2013-218347

(51) Int. Cl.
   *H04N 5/232*   (2006.01)
   *H04N 5/235*   (2006.01)

(52) U.S. Cl.
   CPC ......... *H04N 5/23212* (2013.01); *H04N 5/2353* (2013.01)

(58) Field of Classification Search
   CPC ............ H04N 5/23212; H04N 5/2356; H04N 5/2353; G03B 13/36; G02B 7/28
   See application file for complete search history.

(56) References Cited

U.S. PATENT DOCUMENTS

| 2006/0280429 | A1* | 12/2006 | Shimosato | ......... | H04N 1/32112 386/209 |
| 2014/0253784 | A1* | 9/2014 | Kimura | ..................... | G01C 3/32 348/348 |
| 2015/0144699 | A1* | 5/2015 | Sackett | ............. | G06K 7/10831 235/462.24 |
| 2015/0281553 | A1* | 10/2015 | Ogura | ..................... | G02B 7/09 348/348 |

FOREIGN PATENT DOCUMENTS

JP         06-245025 A     9/1994

* cited by examiner

*Primary Examiner* — Mekonnen Dagnew
(74) *Attorney, Agent, or Firm* — Cowan, Liebowitz & Latman, P.C.

(57) ABSTRACT

An image pickup apparatus arranged to perform a focus adjustment by moving a focus lens based on an image pickup signal, parallelly reading out the image pickup signal obtained in a period set by a timing signal for setting a first exposure period and the image pickup signal obtained in a period set by a timing signal for setting a second exposure period from an image pickup unit by shifting the timing signals from each other in phase, obtain a focus evaluation value from the image pickup signal obtained in the set exposure period, and determine a position of the focus lens corresponding to the focus evaluation value based on a focus lens position when the image pickup signal is read out for the first exposure period and a focus lens position when the image pickup signal is read out for the second exposure period.

8 Claims, 6 Drawing Sheets

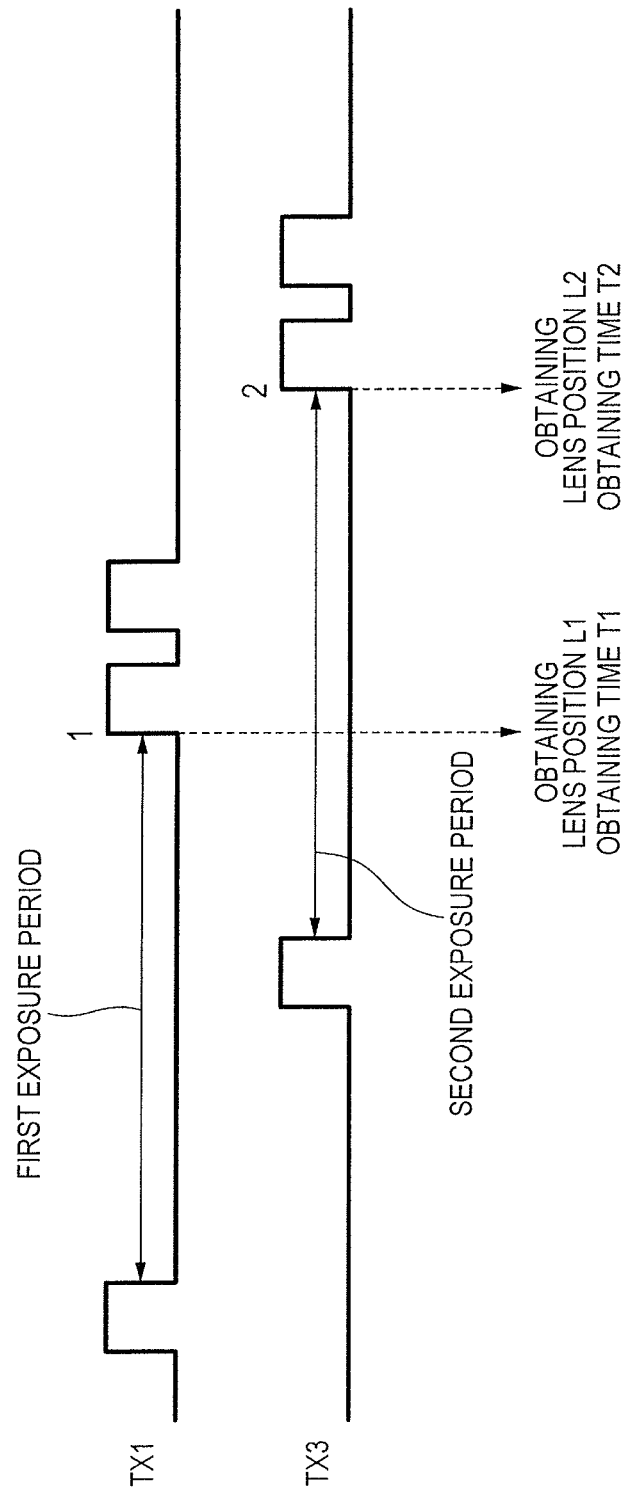

FOCUS ADJUSTMENT APPARATUS, FOCUS ADJUSTMENT METHOD AND PROGRAM, AND IMAGE PICKUP APPARATUS

BACKGROUND OF THE INVENTION

1. Field of the Invention

The present invention relates to an image pickup apparatus such as an electronic still camera and, more particularly, to a focus adjustment apparatus, a focus adjustment method, and a computer program which can be applied to the image pickup apparatus.

2. Description of the Related Art

In image pickup apparatuses such as electronic still camera, video camera, and the like in the related arts, a focus adjustment function called "auto focus" (hereinbelow, referred to as AF) is used in order to focus a photographing optical system on an object. In AF, such a system that image data is obtained from an image pickup element such as CCD, CMOS sensor, or the like and an in-focus position of a focus lens is calculated on the basis of focus evaluation values which are obtained from the image data is known. According to such a system, the position of the focus lens where the focus evaluation value appears to be a maximum value is set to the in-focus position. Therefore, in AF, the focus lens is driven in a predetermined range and the focus evaluation value of each picture (frame) which is obtained during such a drive period of time is stored in correspondence to the focus lens position. The position of the focus lens which is made to correspond to one picture (frame) is set as a position corresponding to half of a movement amount of the focus lens in an exposure period of one picture, that is, as an intermediate position between the position at a time point of start of exposure and the position at a time point of end of the exposure. The position of the focus lens is obtained for a blanking period of one picture and the intermediate position is calculated from an exposure time and a driving speed of the focus lens.

A method whereby a plurality of pixel signals of an image pickup element are read out while shifting a period, thereby increasing a reading speed as a whole is proposed. For example, according to Japanese Patent Application Laid-Open No. H06-245025, signals from odd-numbered pixels and even-numbered pixels among a plurality of pixels are output from a sensor chip with a half-period difference in time therebetween and, thereafter, are combined, thereby realizing a high reading speed. By using such a method, since a period at which the focus evaluation value is obtained is also shortened, many focus evaluation values can be obtained for a short time.

There is a case where even if the lens is controlled so as to be moved at a predetermined speed, an actual moving speed is not constant but fluctuates. In the case of calculating the focus lens position from only the time and the control speed as mentioned above, if the actual moving speed fluctuates during the driving of the focus lens, an error occurs between the calculated intermediate position and the actual intermediate position in an exposure period. Particularly, in the case where a stepping motor of open-loop control is used as a driving motor of the focus lens, since the actual position during the driving is not detected, even if the moving speed fluctuates, it cannot be known. Thus, an error is liable to occur in a calculation result.

It is, therefore, an aspect of the invention is to provide an image pickup apparatus having such a focus adjustment function that even if a moving speed of a focus lens fluctuates, by improving a calculation precision of the focus lens position as an obtaining position of a focus evaluation value, a focus adjustment precision can be improved.

SUMMARY OF THE INVENTION

To accomplish the above aspect, according to the invention, an image pickup apparatus comprises: a focus adjustment unit configured to perform a focus adjustment by moving a focus lens on the basis of an image pickup signal obtained by an image pickup unit; a read-out unit configured to parallelly read out the image pickup signal obtained in a period set according to a timing signal for setting a first exposure period and the image pickup signal obtained in a period set according to a timing signal for setting a second exposure period from the image pickup unit by shifting the timing signal for setting the first exposure period and the timing signal for setting the second exposure period from each other in phase; an evaluation unit configured to obtain a focus evaluation value from the image pickup signal which is obtained in the exposure period set according to the timing signal; and a position determination unit configured to determine a position of the focus lens corresponding to the obtained focus evaluation value on the basis of a position of the focus lens at the time when the image pickup signal is read out according to the timing signal for setting the first exposure period and a position of the focus lens at the time when the image pickup signal is read out according to the timing signal for setting the second exposure period.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating an example of obtaining timing of a position and time of a focus lens in the AF processing operation in FIG. 4.

DESCRIPTION OF THE EMBODIMENTS

Various exemplary embodiments, features, and aspects of the present invention will be described in detail below with reference to the drawings.

First Embodiment

Figure 1:
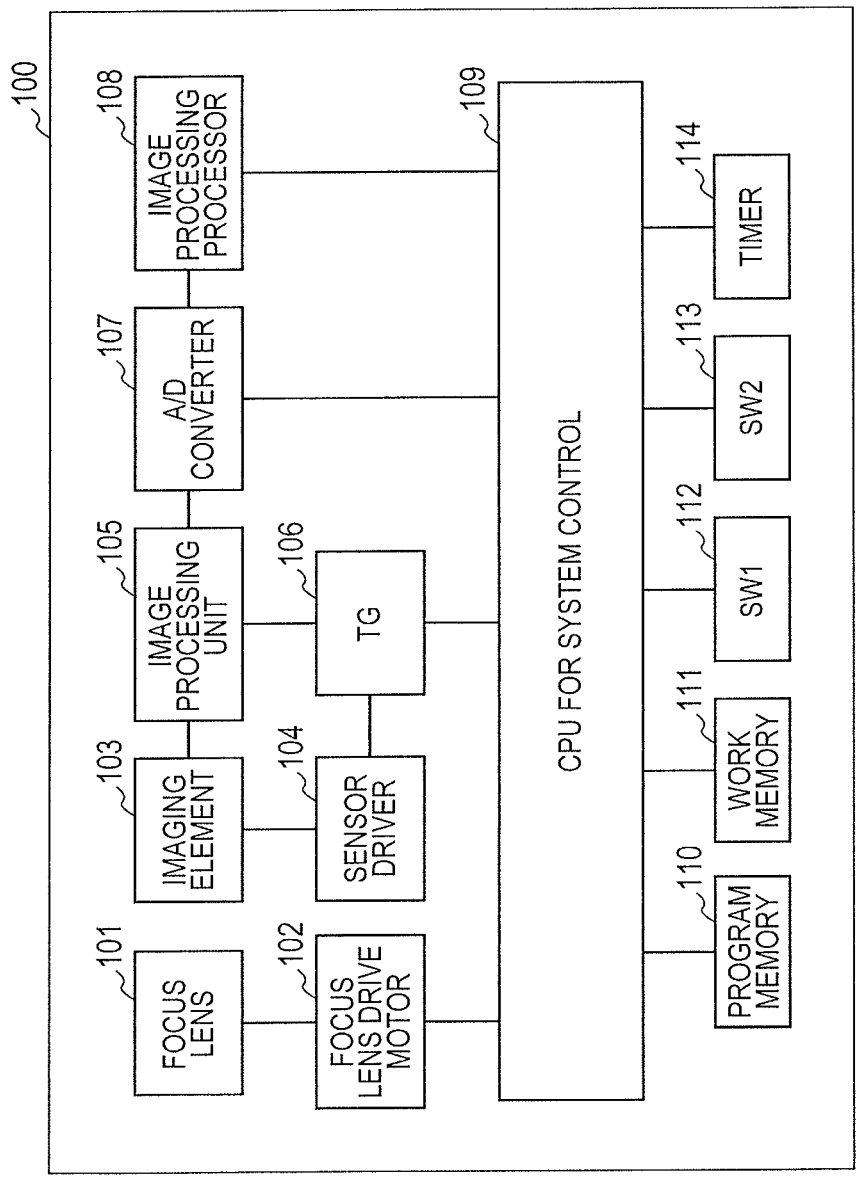
FIG. 1 is a block diagram illustrating a schematic construction of an electronic still camera to which an auto-focus adjustment apparatus according to an embodiment of the invention is applied.

FIG. 1 is a block diagram illustrating a schematic construction of an image pickup apparatus such as an electronic still camera or the like to which a focus adjustment apparatus according to a first embodiment of the invention is applied. An image pickup apparatus 100 has the focus adjustment apparatus in which a focus lens included in an image pickup optical system is moved along its optical axis, thereby performing a focus adjustment, and an object image which is formed by the image pickup optical system is focused to an image pickup element.

In the diagram, a focus lens 101 is provided to focus on the image pickup element, which will be described hereinafter. A focus lens driving motor 102 drives the focus lens 101 along its optical axis. An image pickup element 103 converts incident light from an object into an electric signal and generates an image signal. A sensor driver 104 receives a timing signal from a timing generator, which will be described hereinafter, and outputs a drive signal to the image pickup element 103. An image processing unit 105 receives the electric signal which is photoelectrically converted by the image pickup element 103 and executes various kinds of image processings, thereby generating a predetermined image signal. A timing generator (hereinbelow, referred to as TG) 106 serving as a timing signal generation unit generates a predetermined timing signal.

An A/D converter 107 converts an analog signal which is output from the image processing unit 105 into a digital signal. An image processing processor 108 executes a predetermined processing to image data which is output from the A/D converter 107.

A micro controller (hereinbelow, referred to as CPU) 109 controls a system such as a photographing sequence or the like. A program which is executed by the CPU 109 is stored in a program memory 110. A work memory 111 temporarily stores various kinds of data which are necessary when the CPU 109 executes a processing in accordance with the program stored in the program memory 110.

A photographing preparation instruction switch (hereinbelow, referred to as SW1) 112 is provided to instruct a photographing preparation such as auto exposure control (hereinbelow, referred to as AE), AF, or the like. A photographing processing instruction switch (hereinbelow, referred to as SW2) 113 is provided to instruct a photographing processing such as main exposure, recording operation, or the like after the operation of the photographing preparation instruction switch 112. A timer 114 measures a time.

Subsequently, the operation of the image pickup apparatus 100 in FIG. 1 will be described. In the following description, it is assumed that the CPU 109 executes processings such as storage, discrimination, and the like on the basis of the program stored in the program memory 110 unless otherwise described in particular. It is also assumed that the CPU 109 stores an arithmetic operation result and various kinds of processing data into the work memory 111 unless otherwise described in particular.

First, a construction of image pickup pixels included in the image pickup element 103 will be described with reference to FIG. 2.

Figure 2:
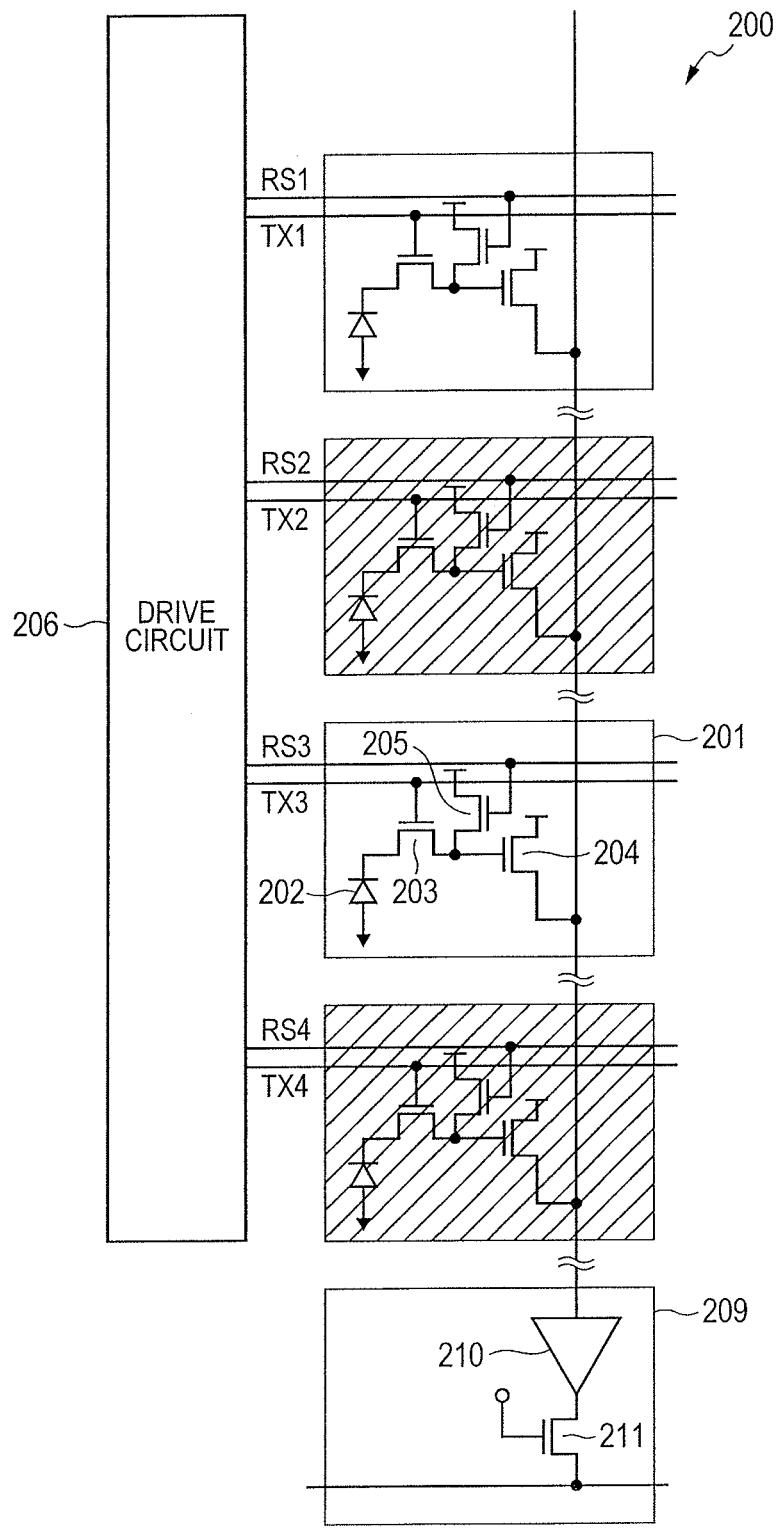
FIG. 2 is a diagram schematically illustrating a partial construction of an image pickup element included in an image pickup apparatus according to the embodiment of the invention.

FIG. 2 illustrates a part of a plurality of pixels which are two-dimensionally arranged on an image pickup plane of the image pickup element 103 and their drive construction. It is now assumed that each pixel column is constructed by four (4 rows) pixels for simplicity of description.

In the diagram, a light receiving pixel unit 200 receives light from the focus lens 101, photoelectrically converts the light which enters the surface into an electric signal, and outputs it. The light receiving pixel unit 200 is constructed by a photodiode 202, a transfer transistor 203, a signal amplifier 204, and a signal reset transistor 205 as one unit (pixel 201).

The transfer transistor 203 and the signal reset transistor 205 operate by signals from a drive circuit 206 connected to the sensor driver 104. A shift register, a signal generation circuit for generating timing signals to drive the transfer transistor 203 and the like, and the like are included in the drive circuit 206. By controlling the transfer transistor 203 and the reset transistor 205 by the generated timing signals (TX1 to TX4, RS1 to RS4, etc.), a resetting and a read-out of electric charges of the photodiode are performed, thereby controlling an exposure time.

A shift register, a column amplifier circuit 210, a signal output selection switch 211, an output circuit (not shown) to output signals to the outside, and the like are included in a horizontal scanning circuit 209. A setting of the column amplifier circuit 210 is changed by the signal from the sensor driver 104 and the signal which is read out of the pixel is amplified.

Figure 3:
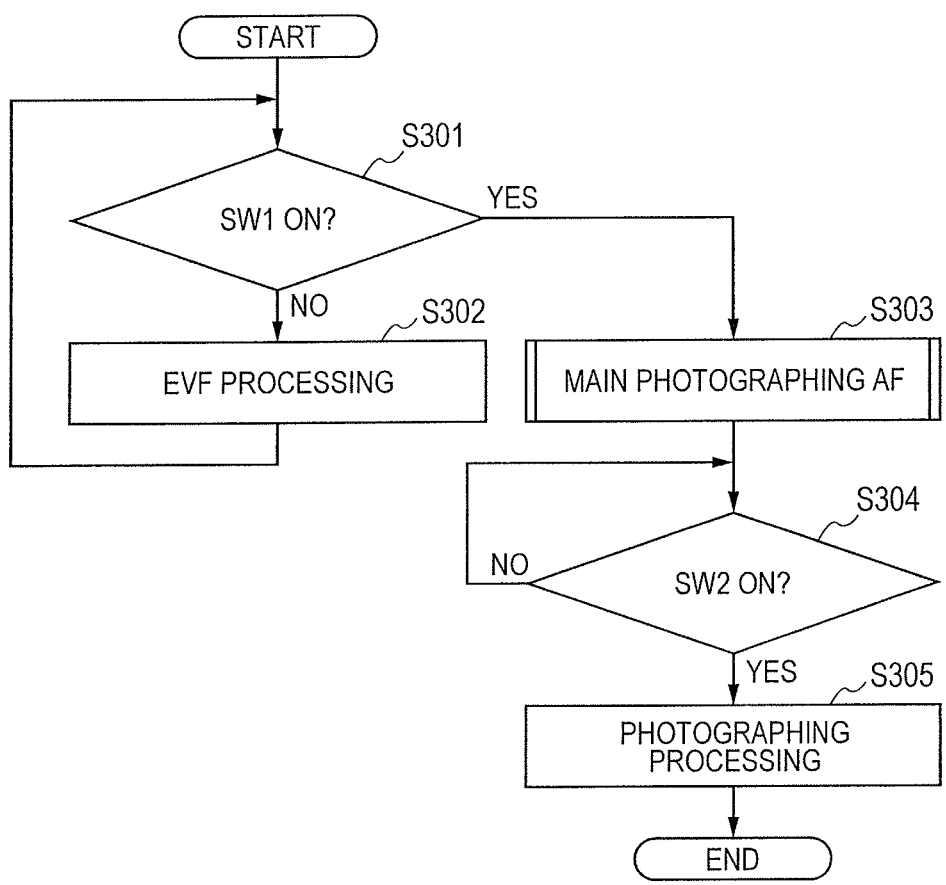
FIG. 3 is a diagram illustrating a flowchart for the photographing operation in the electronic still camera in FIG. 1.

FIG. 3 illustrates a flowchart for the still image photographing operation in the image pickup apparatus 100 in FIG. 1. This operation is realized by a method whereby the CPU 109 executes the program stored in the program memory 110 and controls each unit of the image pickup apparatus.

First, in step S301, the CPU 109 detects a state of the SW1 (112). If it is determined that the SW1 (112) is ON, step S303 follows. If it is determined that the SW1 (112) is OFF, step S302 follows.

In step S302, an EVF processing for displaying an image at the time of a photographing standby onto a display unit (not shown) is executed. In the EVF processing, an AE, an auto white balance (AWB), an image display processing, an image display processing to the image display unit, and the like are executed by the image processing processor 108.

In step S303, a main photographing AF processing, which will be described hereinafter, is executed.

In step S304, the CPU 109 detects a state of the SW2 (113). If it is determined that the SW2 (113) is ON, step S305 follows. If it is determined that the SW2 (113) is OFF, the state of the SW2 (113) is detected again.

In step S305, a photographing processing such as exposure and read-out of the image pickup element 103, image processing by the image processing processor 108, recording of the image data to a recording medium (not shown), or the like is executed.

Figure 4:
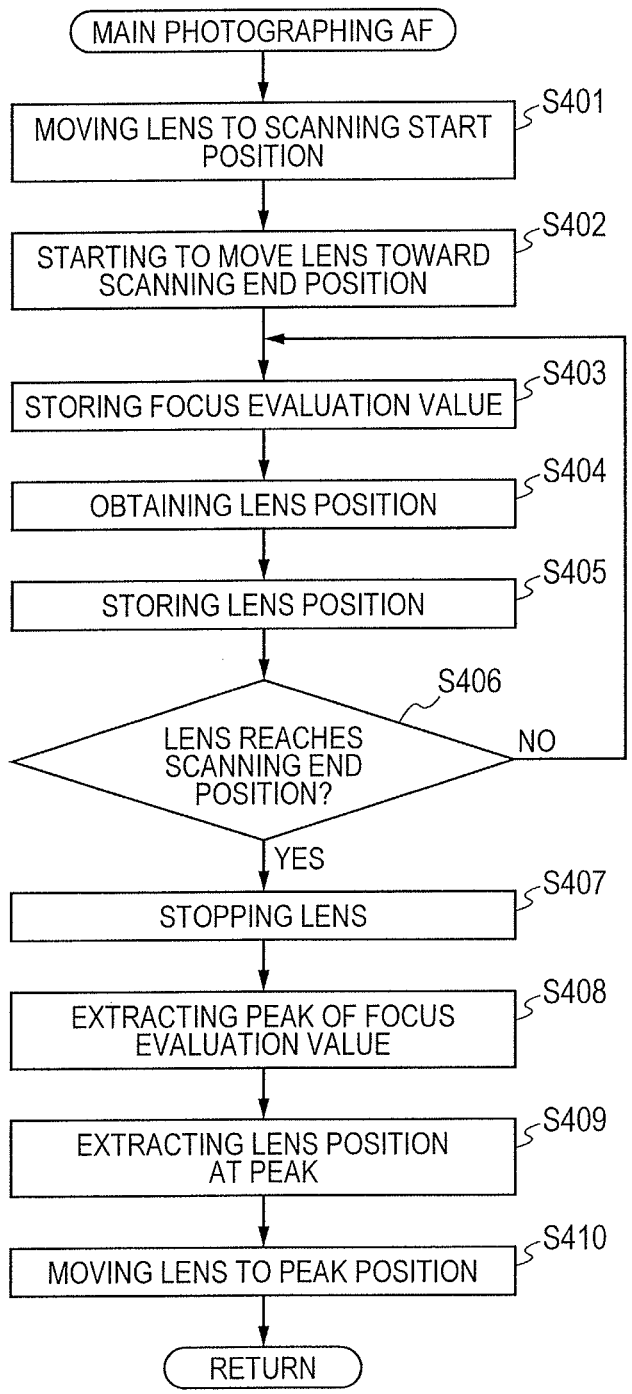
FIG. 4 is a diagram illustrating a flowchart for the AF operation at the time of a main photographing in FIG. 3.

FIG. 4 is a flowchart illustrating details of the AF processing for the main photographing in step S303 in FIG. 3. In the following description, it is assumed that "scan" denotes processings in steps S401 to S406 and "scanning range" denotes a movement range of the focus lens 101.

In step S401, the focus lens 101 is moved to a scanning start position. It is assumed that the scanning start position denotes an infinity end of a focusable range. In step S402, the movement of the focus lens 101 to a scanning end position is started. It is assumed that the scanning end position denotes a nearest end of the focusable range. At this time, the CPU 109 issues a drive instruction to the focus lens driving motor 102 so as to set a moving speed of the focus lens 101 to a predetermined speed. For example, if a stepping motor is used as a focus lens driving motor 102, a drive pulse is output at a predetermined period.

In step S403, the analog image signal which is read out by exposing an image pickup plane of the image pickup element 103 is converted into a digital signal by using the A/D converter 107. The image processing processor 108 extracts a high frequency component of a luminance signal from the image data which is output from the A/D converter 107 and stores it as a focus evaluation value.

In step S404, a position of the focus lens 101 corresponding to the focus evaluation value which is obtained and stored in step S403 is determined. A method of deciding the position will be described later. If the stepping motor is used as a focus lens driving motor 102, the current position of the focus lens 101 is determined on the basis of the number of drive pulses from an initial position (not shown) of the focus lens 101. In step S405, the position of the focus lens 101 determined in step S404 is stored.

In step S406, the CPU 109 discriminates whether or not the current position of the focus lens 101 stored in step S405 reaches the scanning end position. If it is determined that the current position has reached the scanning end position, step S407 follows. If NO, step S403 follows.

In step S407, the movement of the focus lens is stopped.

In step S408, a maximum one of the focus evaluation values stored in step S403, that is, a maximum value (peak) of the focus evaluation value is extracted.

In step S409, a position of the focus lens 101 corresponding to the peak of the focus evaluation value extracted in step S408 from the positions of the focus lens 101 stored in step S405, that is, the lens position at the peak is calculated.

In step S410, the focus lens 101 is moved to the lens position at the peak calculated in step S409. The processing routine is returned to the main routine of FIG. 3.

In the present embodiment, timing for reading out the image pickup signal from the image pickup element 103 in order to obtain the focus evaluation value for AF is controlled so as to differ depending on a pixel row of the light receiving pixel unit. At this time, a reading-out period is not changed every row.

Figure 5:
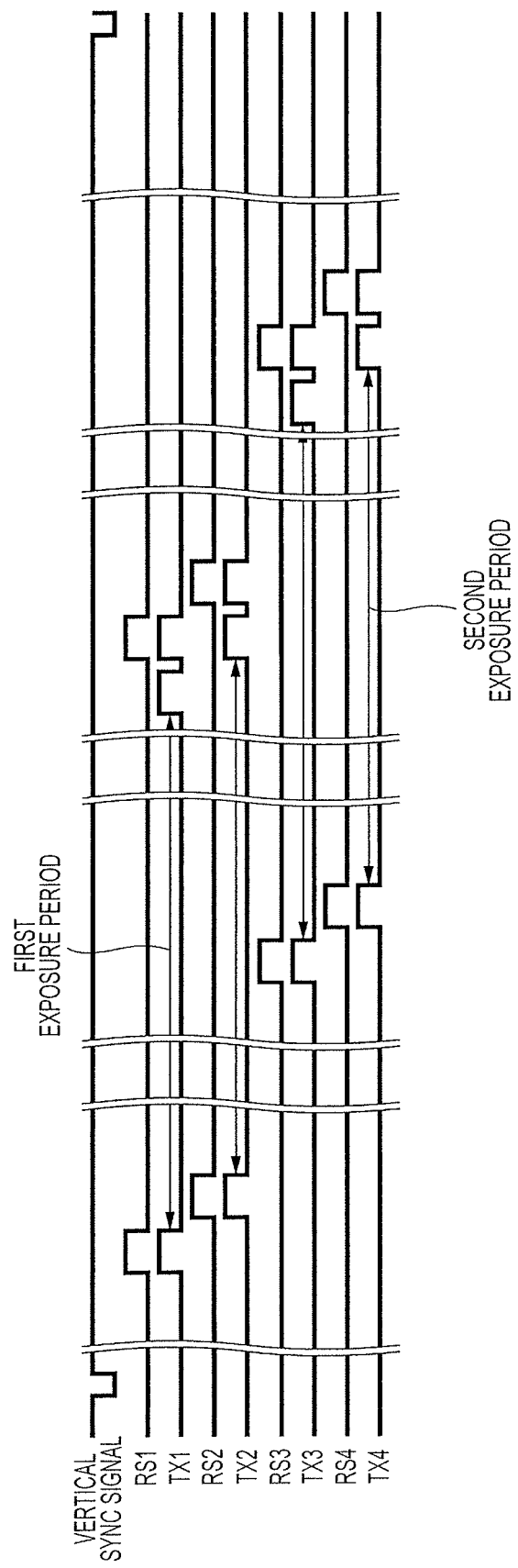
FIG. 5 is a diagram illustrating a timing chart for the operation of a vertical scanning circuit of the electronic still camera to which the auto-focus adjustment apparatus according to the embodiment of the invention is applied.

FIG. 5 is a diagram for describing drive timing at the time when the image pickup element 103 is controlled as mentioned above. A first period and a second period (hereinbelow, referred to as exposure periods) in which the light receiving pixel unit receives the light of the object image and generates the image pickup signal by the photoelectric conversion are set according to the timing signals (TX and RS signals) at a period of two pixel rows and timing for resetting and output transfer of the pixel is made to differ on a row unit basis.

In the pixel of each row, when the TX signal and the RS signal rise, the transfer transistor 203 and the signal reset transistor 205 are turned on and the electric charges of the photodiode 202 of each pixel are reset. When both of the signals trail after that, the exposure is started. Such an operation is sequentially executed in predetermined order for the pixel 201 under conditions set by the TG 106. Subsequently, the TX signal rises after the elapse of a predetermined exposure time and the electric charges of the photodiode 202 are read out to the signal amplifier 204 and are output through the horizontal scanning circuit 209. Thus, the pixel signal in the exposure period is obtained. When the TX signal trails after that, the RS signal rises again and the row in the exposure period is reset.

By executing the similar operation with respect to each row, the exposure of the pixel 201 of each row and the read-out of the pixel signal are performed. However, in the present embodiment, the timings for resetting and output transfer of each row is made to differ by the TX signal and the RS signal so that the start and stop of the first exposure period and the second exposure period illustrated in FIG. 1 are set at a period of two rows. For example, like reset timing of the first and third rows, timing (points in time) when the TX signal and the RS signal rise is made different from each other by half of the exposure period.

As mentioned above, in the present embodiment, although the first exposure period and the second exposure period are equal in period, they are set at a period of two rows as periods in which the reset timing and the read-out timing of the pixel are different from each other by half of the period. In other words, the first exposure period and the second exposure period are equal in period and are different from each other in phase by half of the period. That is, the TX1 signal and the RS1 signal in the first exposure period and the TX3 signal and the RS3 signal in the second exposure period are equal in period and are different from each other in rising timing by half of the period. This is true of the TX2 signal and the RS2 signal and the TX4 signal and the RS4 signal. By setting the signals as mentioned above, since the focus evaluation values can be obtained from the pixel signal which is read out in each of the first exposure period and the second exposure period, the focus evaluation values can be obtained at the period which is twice as large as that in the case where the focus evaluation values are obtained at a single exposure period.

Subsequently, a method of obtaining the position of the focus lens 101 in S404 in FIG. 4 will be described. FIG. 6 is a diagram illustrating only the TX1 signal and the TX3 signal among the drive timing signals of the image pickup element described in FIG. 5.

First, the position of the focus lens 101 is obtained at the timing (timing of 1 in FIG. 6) of reading out the pixel data exposed in the first exposure period. The position at this point in time is assumed to be L1. At the same time, the current time is obtained from the timer 114. The time at this time point is assumed to be T1. Subsequently, the position of the focus lens 101 is obtained at the timing (timing of 2 in FIG. 6) of reading out the pixel data exposed in the second exposure period. The position at this point in time is assumed to be L2. At the same time, the current time is obtained from the timer 114. The time at this time point is assumed to be T2.

A movement amount L between the positions L1 and L2 of the focus lens 101 obtained in this manner is calculated by the following equation (1).

$$L = L2 - L1 \qquad (1)$$

Similarly, a time T of movement of the focus lens from the position L1 to the position L2 is calculated by the following equation (2) as a time difference between the point in time when the position L1 is obtained and the point in time when the position L2 is obtained.

$$T = T2 - T1 \qquad (2)$$

Therefore, an average speed V of movement of the focus lens 101 from the position L1 to the position L2 is calculated by the following equation (3).

$$V = L/T \qquad (3)$$

Since the average speed V obtained as mentioned above is based on the actual movement amount of the focus lens 101, even if a moving speed of the focus lens 101 fluctuates from an instructed speed, the average speed V is such a speed implicitly including such a fluctuation.

A position P of the focus lens 101 at the time when the focus evaluation value is obtained is obtained from the average speed V and the exposure time. Since the first exposure period and the second exposure period are different from each other in phase by half of the period, a time which is required to move the lens by the movement amount L is equal to a duration of ½ of the exposure period. Therefore, assuming that an exposure time is set to t, the focus lens position P in the second exposure period in FIG. 6 is calculated by the following equation (4) as an intermediate position of the exposure period.

$$P = L2 - (V \times t/2) \qquad (4)$$

The calculated position P of the focus lens is stored in association with the evaluation value obtained from the image pickup signal which is read out in the second exposure period.

Also with respect to the first exposure period, the focus lens position P can be calculated in a manner similar to the foregoing second exposure period. For example, the position of the focus lens is obtained at the timing of the first TX3 signal (reset to start the second exposure period) in FIG. 6 and the read-out timing 1 of the first exposure period, the average speed V is calculated, and the position P is calculated from the equation (4) with reference to the position L1.

In this manner, in the present embodiment, on the basis of the positions obtained at the timing for obtaining the pixel signals in the two exposure periods, the position of the focus lens 101 at the time when the focus evaluation value is obtained is calculated (determined). Therefore, even if the moving speed of the focus lens 101 fluctuates from the instructed speed, a calculation error due to such a fluctuation can be reduced.

In the above description, the position of the focus lens 101 is obtained at the read-out timing of the image pickup signal in the first exposure period and the second exposure period. However, a position at an exposure start point in time may be obtained and a position at the time when the focus evaluation value is obtained may be calculated on the basis of the position data of three points. In addition, the obtainment at the read-out timing of the image pickup signal in the first exposure period and the second exposure period may be performed a plurality of number of times and the position of the focus lens 101 may be calculated. If the number of position data which is used in the calculation is increased as mentioned above, a calculation precision can be improved for such an increased amount.

It is also possible to perform the focus adjustment on the basis of the focus evaluation value obtained from the image pickup signal derived in the second exposure period and the position of the focus lens stored in correspondence thereto and perform a live-view display by using the image pickup signal derived in the first exposure period.

According to the foregoing invention, the focus adjustment apparatus in which even in the case where the moving speed of the focus lens fluctuates, by improving the calculation precision of the focus lens position as an obtaining position of the focus evaluation value, the focus adjustment precision can be improved can be provided can be provided.

Other Embodiments

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-218347, filed on Oct. 21, 2013, which is hereby incorporated by reference herein in its entirety.

What is claimed is:

1. An image pickup apparatus comprising:
a focus adjustment unit configured to perform a focus adjustment by moving a focus lens on the basis of an image pickup signal obtained by an image pickup unit;
a read-out unit configured to parallelly read out the image pickup signal obtained in a period set according to a timing signal for setting a first exposure period and the image pickup signal obtained in a period set according to a timing signal for setting a second exposure period from the image pickup unit by shifting the timing signal for setting the first exposure period and the timing signal for setting the second exposure period from each other in phase;
an evaluation unit configured to obtain a focus evaluation value from the image pickup signal which is obtained in the exposure period set according to the timing signal; and
a position determination unit configured to determine a position of the focus lens corresponding to the obtained focus evaluation value on the basis of a position of the focus lens at the time when the image pickup signal is read out according to the timing signal for setting the first exposure period and a position of the focus lens at the time when the image pickup signal is read out according to the timing signal for setting the second exposure period.

2. An apparatus according to claim 1, wherein the timing signal is signal for setting a start and a stop of the exposure period and the timing signal for determining the position of the focus lens is a signal for setting the stop of the exposure period.

3. An apparatus according to claim 1, wherein the first exposure period and the second exposure period are equal in period and are different from each other in phase by half of the period.

4. An apparatus according to claim 3, wherein assuming that a position of the focus lens determined according to the timing signal for setting a stop of the first exposure period is set to L1, a position of the focus lens determined according to the timing signal for setting a stop of the second exposure period is set to L2, a time obtained at the position L1 of the focus lens is set to T1, a time obtained at the position L2 of the focus lens is set to T2, an average speed of movement of the focus lens from the position L1 of the focus lens to the position L2 of the focus lens is set to V, an exposure time of the first exposure period and the second exposure period is set to t, and a position of the focus lens corresponding to the focus evaluation value obtained in the second exposure period is set to P, $$L=L2-L1,$$

$$T=T2-T1,$$

$$V=L/T, \text{ and}$$

$$P=L2-(V \times t/2)$$

are satisfied.

5. An apparatus according to claim 1, wherein the focus adjustment is performed on the basis of the focus evaluation value obtained in the second exposure period and the position P of the focus lens corresponding to the focus evaluation value obtained in the second exposure period, and a live-view display is performed on the basis of the image pickup signal obtained in the first exposure period.

6. An apparatus according to claim 1, wherein the second exposure period is shorter than the first exposure period.

7. An imaging method comprising:
a focus adjustment step of performing a focus adjustment by moving a focus lens on the basis of an image pickup signal obtained by an image pickup unit;
a read-out step of parallelly reading out the image pickup signal obtained in a period set according to a timing signal for setting a first exposure period and the image pickup signal obtained in a period set according to a timing signal for setting a second exposure period from the image pickup unit by shifting the timing signal for setting the first exposure period and the timing signal for setting the second exposure period from each other in phase;
an evaluation step of obtaining a focus evaluation value from the image pickup signal which is obtained in the exposure period set according to the timing signal; and
a position determination step of determining a position of the focus lens corresponding to the obtained focus evaluation value on the basis of a position of the focus lens at the time when the image pickup signal is read out according to the timing signal for setting the first exposure period and a position of the focus lens at the time when the image pickup signal is read out according to the timing signal for setting the second exposure period.

8. A non-transitory computer-readable storage medium which stores a program for causing a computer to execute the imaging method according to claim 7.

* * * * *